Patented May 25, 1943

2,320,060

UNITED STATES PATENT OFFICE 2,320,060

SOIL TREATMENT AND COMPOSITION THEREFOR

Blanche B. Barlow, Los Angeles, and Joseph D. Haynes, Tustin, Calif., assignors, by mesne assignments, of one-half to F. S. Hollister and one-half to C. H. Breon No Drawing. Application March 4, 1940, Serial No. 322,174

3 Claims. (Cl. 71—23)

Our invention relates to soil treatment and compositions therefor, and has particular reference to the conditioning of soils to fit them for various agricultural purposes or to recondition exhausted soils to render them again fit for agricultural purposes.

Soils for the production of most plant life, particularly fruits, vegetables and similar products, require primarily a conditioning which will permit the ready percolation of water deep into the soil and further to permit air to readily penetrate into the soil about the roots of the plants.

Many soils contain the desirable plant life supporting constituents but, due to an excess of alkalies in the soil or the exhaustion of the soil, the soil particles become so compacted as to render it substantially impossible for rain or irrigation moisture to penetrate into the soil to any appreciable depth and, what is probably more important, the soils are so compacted as to prevent the ingress of air to the roots of the plant with the result that little or no agricultural crops can be grown thereon.

The condition of excess alkalinity of the soil is particularly prevalent in arid or semi-arid localities so that in order to render these soils proper for agricultural purposes it is first necessary to neutralize such alkalinity. It is a characteristic of alkaline soils that if treated with acids neutralizing the alkalinity of the soil, the soil becomes flocculated, making the soil pervious to moisture to relatively great depths and, due to the flocculence of the soil, the ingress of air and the rendering available to the roots, trees and plants of nourishing plant foods is made possible.

Heretofore various attempts have been made to neutralize such alkaline soils by treating the soil with relatively strong acids, particularly phosphoric acid, but such attempts have been only partially successful, apparently due to the fact that the necessary concentrations of the neutralizing agents cannot be applied effectively to the soil without producing undesirable acid conditions at the soil surface and a failure to produce the desired neutralization and flocculence at any appreciable depth.

Moreover, soils which are normally flocculent when improperly managed become deflocculated, that is, the groups or bundles or crumbs of the soil break up into smaller particles which then become compacted together, preventing the penetration of moisture into the soil. It is therefore necessary to treat these soils to recondition them and even though the cause of the deflocculation is not necessarily an excess of alkalinity, an acid treatment of these soils is desirable to reflocculate the same.

We have discovered that a most effective treatment of either normally alkaline soils or soils which have become deflocculated from other causes is the treatment of such soils with a liquid solution having as its primary constituent a liquid base which is extracted from certain cactus plants and it is therefore an object of our invention to provide a method for soil treatment in which an organic acid produced from such cactus plants is applied directly to the soil surface.

Another object of our invention is to provide a treatment for soils as set forth in the preceding paragraph, wherein the organic acid is either applied as a dilute solution before watering or irrigation of the soil or may be directly added to the irrigation water.

Another object of our invention is to provide a soil treatment of the character set forth, in which the organic acid as a base may have added to it other acids, such as phosphoric acid, sulphuric acid and nitric acid, and other plant food chemicals so as to provide in a single operation both a conditioning of the soil and a fertilization of the soil.

Another object of our invention is to provide a liquid fertilizer base in which inorganic acids, nitrates, phosphates, potash and other plant foods may be maintained in colloidal suspension for dilution with irrigation water and which will maintain these elements in colloidal suspension and substantially even distribution throughout the irrigation water.

Other objects of our invention will be apparent from a study of the following specifica- organic acid base and the manner of its preparation is disclosed and to which may be added the other soil conditioning and fertilizing constituents which, from analysis of the soil and the character of agricultural crop to be produced therefrom, is indicated as desirable.

First a liquid base is prepared. This base is preferably made from either the root stock or the trunk and limb stock of one or more of the cactus plants common to western America. One of such plants is known as cereus giganteus or giant cactus, others of which are known as yucca, species of which known as "Spanish dagger," "dagger plant" or "Spanish bayonet" are well known.

The preparation of the base consists essentially in grinding the peeled limbs or roots into a pulp which may be placed in wire mesh baskets, inserted into vats or tanks in which live steam is injected into and through the mass, the steam absorbing and removing all of the saponaceous materials, glucosides, sugars and other organic material from the pulp, leaving the pulp a relatively dry fibrous mass. The steam is condensed retaining the extracted material in solution and this solution constitutes the liquid base which may be used either alone or with other material, as hereinafter described, dissolved therein or maintained in colloidal suspension therein.

In view of the fact that the extracted material from each batch of root stock treated may vary in the amount of saponaceous materials, glucosides, sugars or other organic material contained therein, we prefer to control, regulate or standardize the dilutions to be used in actual soil treatment by evaporating or diluting the now liquid solution until the amount of organic material therein equals 2.5 per cent.

The standardized base, hereinbefore described, may be used alone with very effective results as a soil flocculent and, by reason of the organic materials therein, the exact composition of which is not known but which appears to include glucosides, sugars and alcohols, constitutes effective plant foods and achieving remarkable results in plant growth and in the control of many plant diseases.

Actual tests of soils treated with this base material indicate that it possesses the characteristic of acting as a flocculating agent for soils from 300 to 400 times greater than other known soil treatments such as phosphoric acid, gypsum, sulphur, lime, aluminum sulphate and iron sulphate. The effect of treating such soil with this base is to reduce the pH of the soil to render it substantially neutral. For example, laboratory tests were made according to the following procedure: Four containers having perforated bottoms were filled with 200 grams of the soil to be tested and each of these containers was placed above a receptacle positioned to catch any liquid percolating through the soil to thereby permit the measuring of the volume of such percolating liquid. 300 c. c. of liquid was then poured into the top of each container and after a predetermined test period the quantity of liquid passing through the soil was measured, the acidity or alkalinity of the soil was determined, and the proportional quantity of total chlorides removed from the soil was ascertained. Such a test was performed on an alkaline loam soil by treating sample No. 1 with water as a check and by treating samples Nos. 2, 3 and 4 with water carrying ten, twenty and thirty milligrams, respectively, of treatment solution, such quantity (with respect to the amount of soil treated) corresponding to an application of five, ten and fifteen gallons of cactus extract per acre, respectively. The test period was three days. The results of this test are set out in the following table in which percolation is shown in cubic centimeters; the total chlorides removed from the soil are indicated in parts per million and the acidity or alkalinity of the samples after treatment is indicated in pH units.

|    |            | Percolation c. c. | Total chlorides P. P. M. | pH  |
|----|------------|-------------------|--------------------------|-----|
| #1 | Check      | 55                | 595                      | 8.0 |
| #2 | 5 gallons  | 70                | 700                      | 7.8 |
| #3 | 10 gallons | 150               | 900                      | 7.3 |
| #4 | 15 gallons | 210               | 903                      | 7.2 |

The treated soil with 15 gallons per acre drained out 210 c. c. of water or 3.8 times as much water as the untreated soil. The chlorides removed from the check sample No. 1 were 595 P. P. M. while the treated soil drained off 903 P. P. M. of chlorides. The pH was reduced from pH of 8.0 to 7.2.

Similar laboratory tests on neutral compact soil showed the following on flocculation. The period of time was six hours and the amount of water was 300 c. c. The ratio of 5, 10 and 15 gallons of base per acre was used. The soil was a red loam.

|    |            | Percolation c. c. |
|----|------------|-------------------|
| #1 | Check      | 50                |
| #2 | 5 gallons  | 140               |
| #3 | 10 gallons | 160               |
| #4 | 15 gallons | 255               |

The treated soils all showed increase in water percolation. The soil treated with 15 gallons per acre drained out 255 c. c. of water or 5.1 times as much water as the check.

Another important characteristic of the base is its ability to maintain in colloidal solution relatively great quantities of well known soil fertilizers and treatment material. For example, relatively great concentrations of phosphoric acid may be produced by adding to the liquid base as much as 20 per cent by weight which is found to be readily maintained in colloidal solution not only in the base but also evenly distributed throughout the dilute mixture with irrigation water.

Again by reason of the great ability of the base to carry and maintain in dilute solutions of the base a colloidal suspension of mineral matter, other necessary soil conditioning and plant food constituents may also be added to the base and the proportions of such minerals and plant foods may be varied to suit the conditions and requirements of the particular soil to be treated and the particular crop proposed to be grown thereon. For example, the standard ratios of nitrates, phosphates and potash recognized as fertilizers may be readily prepared with the base as, for example, preparing a mixture of liquid base from 60 to 70 per cent, phosphoric acid 15 to 20 per cent, potassium nitrate 10 to 15 per cent, and urea from .5 to 1 per cent, which will produce a combination known as 2-10-5. Other combinations such as a standard 4-10-5 may be employed by increasing the ratio of urea used. Again a 6-10-5 combination may be produced by again increasing the ratio of the urea employed, the amount of the percentage of the liquid base being reduced as the ratio of urea is increased.

Again, the characteristic of this base material of maintaining in colloidal suspension of mineral matter permits its use, not only as a fertilizer, soil flocculent and carrier for plant foods, but also as a carrier for mineral treatment materials to check and overcome various plant diseases. For example, it has long been known that an effective treatment for "mottle leaf" in citrus trees and "little leaf" in grapes is the employment of zinc in some form as to render it available to the roots of the trees and vines. However, it has been substantially impossible to make such zinc compounds sufficiently available to the plants to affect cures. However, by adding zinc sulphate to the base described herein, ample effective quantities of the zinc compound is made available to the plants. For example, a complete cure in badly diseased areas has been effected by adding zinc sulphate in the proportions of 2½ pounds per gallon of base, which may be then added to the irrigation water as hereinbefore described.

Other types of diseases may also be readily treated and cured by the inclusion with the cactus extract of various other chemicals, particularly various types of chlorosis may be cured by employing a combination of the cactus extract with zinc sulphate, as hereinbefore described, or by the cactus extract to which various sulphate has been added or by cactus extract to which manganese sulphate has been added. In the treatment of some forms of diseases, it may be desirable to include with the cactus extract a combination of one or more of the zinc iron manganese or other metal compounds.

It has also been discovered that the cactus extract, either alone or in combination with phosphoric acid as hereinbefore described, is particularly effective in reducing the pH of irrigation water where the available source of water supply includes natural minerals lending a high pH to the water. Relatively small quantities of the cactus extract or the cactus extract in combination with inorganic acids may readily correct this undesirable condition.

As stated hereinbefore, the exact character and composition of the cactus extract is not known and the reasons for its behavior as a suspension medium is not known. It is to be understood that reference herein to "cactus juice" and "cactus extract" is intended to mean those products of the roots, trunk, limbs or leaves of cactus plants which produce the desirable suspension results and that, while one manner of extracting these "juices" or "extracts" has been described herein, the term "extract" is intended to mean the resultant extracted material and is not to be construed as limiting the manner of producing such extract.

It is apparent therefore that we have devised a soil treatment which may be readily and effectively employed for either the rehabilitation of exhausted soils or the conditioning of strongly alkaline soils to render them useful for productive agricultural purposes. Moreover, it will be further apparent that we have devised a soil treatment which not only achieves a soil conditioning effect, as set forth above, but also we have devised a method by which the minerals essential for healthy plant life may be made available in forms readily utilized by the plants as well as devising a medium by which mineral treatments for the checking and controlling of disease in plants may be readily and effectively applied.

While we have described the preferred embodiment of our invention, we do not desire to be limited to any of the details defiend herein, except as defined in the appended claims.

We claim:

1. The method of preparing a soil treating agent which is adapted to increase the flocculation of soil and serve as a vehicle for plant food material, which consists in mixing cactus juice with a sufficient quantity of inorganic mineral salts to form a concentrated solution of the mixture.

2. In a method as set forth in claim 1, the additional step of diluting the concentrated solution with water to produce an irrigation liquid for the soil.

3. A soil flocculating, acidizing and plant food agent comprising an aqueous solution of cactus juice extract containing a concentrated mixture of inorganic mineral plant food salts.

BLANCHE B. BARLOW.
JOSEPH D. HAYNES.